(12) United States Patent
Dissanayake

(10) Patent No.: US 11,336,798 B2
(45) Date of Patent: May 17, 2022

(54) IMAGE FORMING SYSTEM, IMAGE FORMING APPARATUS, AND DOCUMENT SERVER APPARATUS

(71) Applicant: KYOCERA DOCUMENT SOLUTIONS INC., Osaka (JP)

(72) Inventor: Manori Dissanayake, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/337,590

(22) Filed: Jun. 3, 2021

(65) Prior Publication Data

US 2021/0385354 A1 Dec. 9, 2021

(30) Foreign Application Priority Data

Jun. 5, 2020 (JP) .............................. JP2020-098355

(51) Int. Cl.
*H04N 1/44* (2006.01)
*H04N 1/00* (2006.01)
(Continued)

(52) U.S. Cl.
CPC ........... *H04N 1/444* (2013.01); *G06F 3/1203* (2013.01); *G06F 3/1238* (2013.01); *G06F 3/1285* (2013.01); *G06K 7/1417* (2013.01); *G06V 30/40* (2022.01); *H04L 9/30* (2013.01); *H04N 1/00244* (2013.01); *H04N 1/00326* (2013.01); *H04N 1/32101* (2013.01); *H04N 1/32149* (2013.01);
(Continued)

(58) Field of Classification Search
None
See application file for complete search history.

(56) References Cited

U.S. PATENT DOCUMENTS

| 9,027,118 B2* | 5/2015 | Ohba | G06F 21/608 726/19 |
| 2004/0125402 A1* | 7/2004 | Kanai | G06F 21/608 358/1.15 |

(Continued)

FOREIGN PATENT DOCUMENTS

| JP | 2013073461 A | 4/2013 |
| JP | 2014099132 A | 5/2014 |
| JP | 2018010544 A | 1/2018 |

*Primary Examiner* — Miya J Williams
(74) *Attorney, Agent, or Firm* — Li & Cai Intellectual Property (USA) Office

(57) ABSTRACT

A system includes an image forming apparatus, a first document server apparatus, and a key server apparatus, the image forming apparatus being configured to determine whether document data is private or public, when the document data is determined to be private, then determine a level accessible to the document data, and transmit level information indicating the level and the document data to the first document server apparatus, the first document server apparatus being configured to receive the level information and the document data from the image forming apparatus, generate a document ID for identifying the document data, store the document data in association with the document ID, transmit the document ID to the image forming apparatus, determine an accessible user ID that identifies a user accessible to the document data based on the level information, generate a public key and a private key used to encrypt the document data.

7 Claims, 12 Drawing Sheets

(51) Int. Cl.
*H04N 1/32* (2006.01)
*G06F 3/12* (2006.01)
*G06K 7/14* (2006.01)
*H04L 9/30* (2006.01)
*G06V 30/40* (2022.01)
*G06V 30/10* (2022.01)

(52) U.S. Cl.
CPC ......... *H04N 1/4413* (2013.01); *H04N 1/4486* (2013.01); *G06V 30/10* (2022.01); *H04N 1/00331* (2013.01); *H04N 1/00334* (2013.01); *H04N 1/00363* (2013.01); *H04N 1/00843* (2013.01); *H04N 2201/0094* (2013.01)

(56) References Cited

U.S. PATENT DOCUMENTS

| | | | |
|---|---|---|---|
| 2005/0141010 A1* | 6/2005 | Kanai | H04N 1/4493 358/1.14 |
| 2008/0192287 A1* | 8/2008 | Iwai | G06F 21/606 358/1.15 |
| 2010/0007710 A1* | 1/2010 | Miyaso | H04N 1/387 358/1.15 |
| 2020/0409635 A1* | 12/2020 | Chen | G06F 21/608 |

* cited by examiner

IMAGE FORMING SYSTEM, IMAGE FORMING APPARATUS, AND DOCUMENT SERVER APPARATUS

CROSS-REFERENCE TO RELATED PATENT APPLICATION

This application claims the benefit of Japanese Priority Patent Application JP 2020-098355 filed Jun. 5, 2020, the entire contents of which are incorporated herein by reference.

FIELD OF THE DISCLOSURE

The present disclosure relates to an image forming apparatus, and a document server apparatus that receives document data from the image forming apparatus and stores the document data. The present disclosure relates to an image forming system including the image forming apparatus and the document server apparatus.

BACKGROUND OF THE DISCLOSURE

There is known an image forming apparatus that uploads document data into a document server apparatus to store the document data.

SUMMARY OF THE DISCLOSURE

It is desirable, in the technology of an image forming apparatus that uploads document data into a document server apparatus to store the document data, to store each document data depending on security level needed.

According to an embodiment of the present disclosure, there is provided an image forming system, including:
an image forming apparatus;
a first document server apparatus communicably connected to the image forming apparatus; and
a key server apparatus communicably connected to the image forming apparatus and the first document server apparatus,
the image forming apparatus being configured to
  determine whether document data is private or public,
  when the document data is determined to be private, then
  determine a level accessible to the document data, and
  transmit level information indicating the level and the document data to the first document server apparatus,
the first document server apparatus being configured to
  receive the level information and the document data from the image forming apparatus,
  generate a document ID for identifying the document data,
  store the document data in association with the document ID,
  transmit the document ID to the image forming apparatus,
  determine an accessible user ID that identifies a user accessible to the document data based on the level information,
  generate a public key and a private key used to encrypt the document data,
  store the private key and the public key in association with the document ID, and
  transmit the public key, the document ID, and the accessible user ID to the key server apparatus,
the image forming apparatus being configured to
  receive the document ID from the first document server apparatus,
  convert the document ID into a first code optically readable,
  combine the first code and the document data to generate composite document data, and
  form an image of the composite document data on a print medium, the key server apparatus being configured to
receive the public key, the document ID, and the accessible user ID from the first document server apparatus and stores the public key, the document ID, and the accessible user ID in association with each other.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Figure 1:
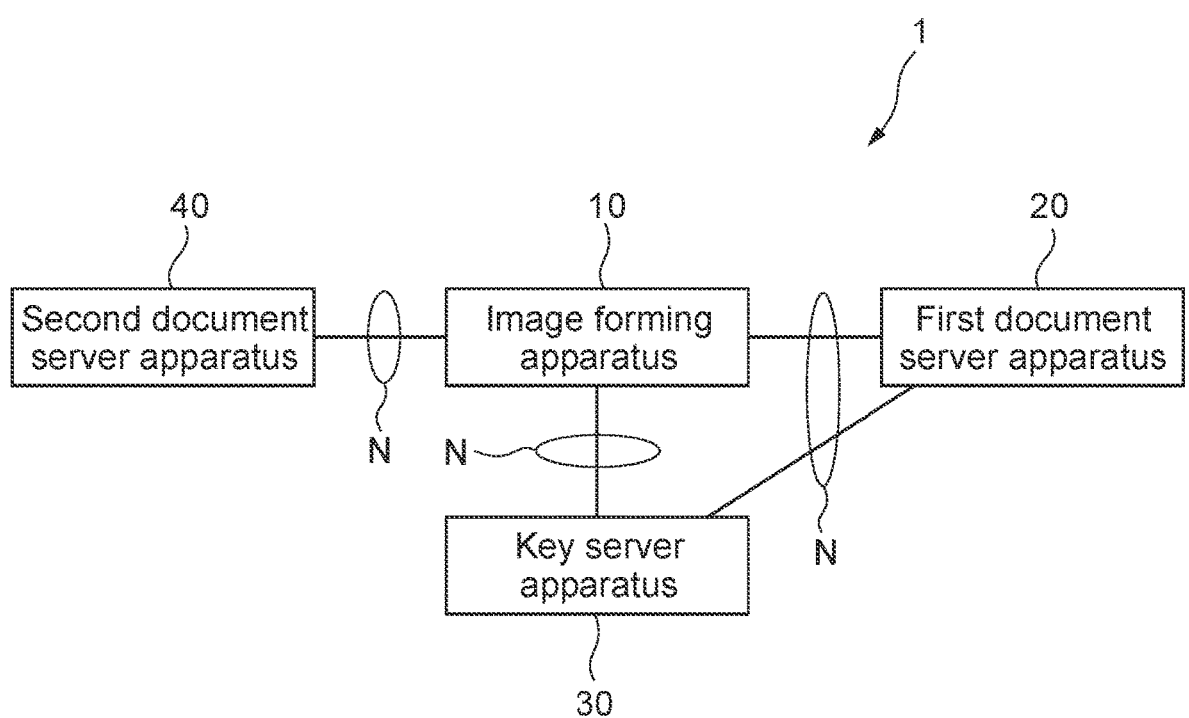
FIG. 1 shows an image forming system according to an embodiment of the present disclosure.

Hereinafter, an embodiment of the present disclosure will be described with reference to the drawings.
1. Outline of Image Forming System
FIG. 1 shows an image forming system according to an embodiment of the present disclosure.
The image forming system 1 includes an image forming apparatus 10, a first document server apparatus 20, a key server apparatus 30, and a second document server apparatus 40. The image forming apparatus 10, the first document server apparatus 20, and the key server apparatus 30 are connected to each other so as to be able to communicate with each other via a network N such as the Internet N. The second document server apparatus 40 is connected to at least the image forming apparatus 10 so as to be able to communicate with each other via a network N such as the Internet N.

For example, the apparatus 10 is typically an MFP (Multifunction Peripheral). The image forming apparatus 10 receives document data from an end user's terminal device (personal computer, tablet computer, smartphone, or the like, not shown) via the network N. The image forming apparatus 10 prints an image of the document data and uploads the document data to the first document server apparatus 20 or the second document server apparatus 40. Specifically, the image forming apparatus 10 uploads the private document data to the first document server apparatus 20 and uploads the public document data to the second document server apparatus 40.

The first document server apparatus 20 stores the private document data uploaded from the image forming apparatus 10. The first document server apparatus 20 encrypts the private document data to be stored and downloads the encrypted document data to the image forming apparatus 10.

The key server apparatus 30 stores a public key used for encryption by the first document server apparatus 20.

The first document server apparatus 20 stores public document data uploaded from the image forming apparatus 10. The second document server apparatus 40 downloads (without encryption) the public document data to be stored, to the image forming apparatus 10.

The first document server apparatus 20, the key server apparatus 30, and the second document server apparatus 40 may be implemented by a plurality of physically independent information processing apparatuses (FIG. 1). On the other hand, part or all of the first document server apparatus 20, the key server apparatus 30, and the second document server apparatus 40 may be realized by a single physical information processing apparatus.

2. Hardware Configuration of Image Forming Apparatus

Figure 2:
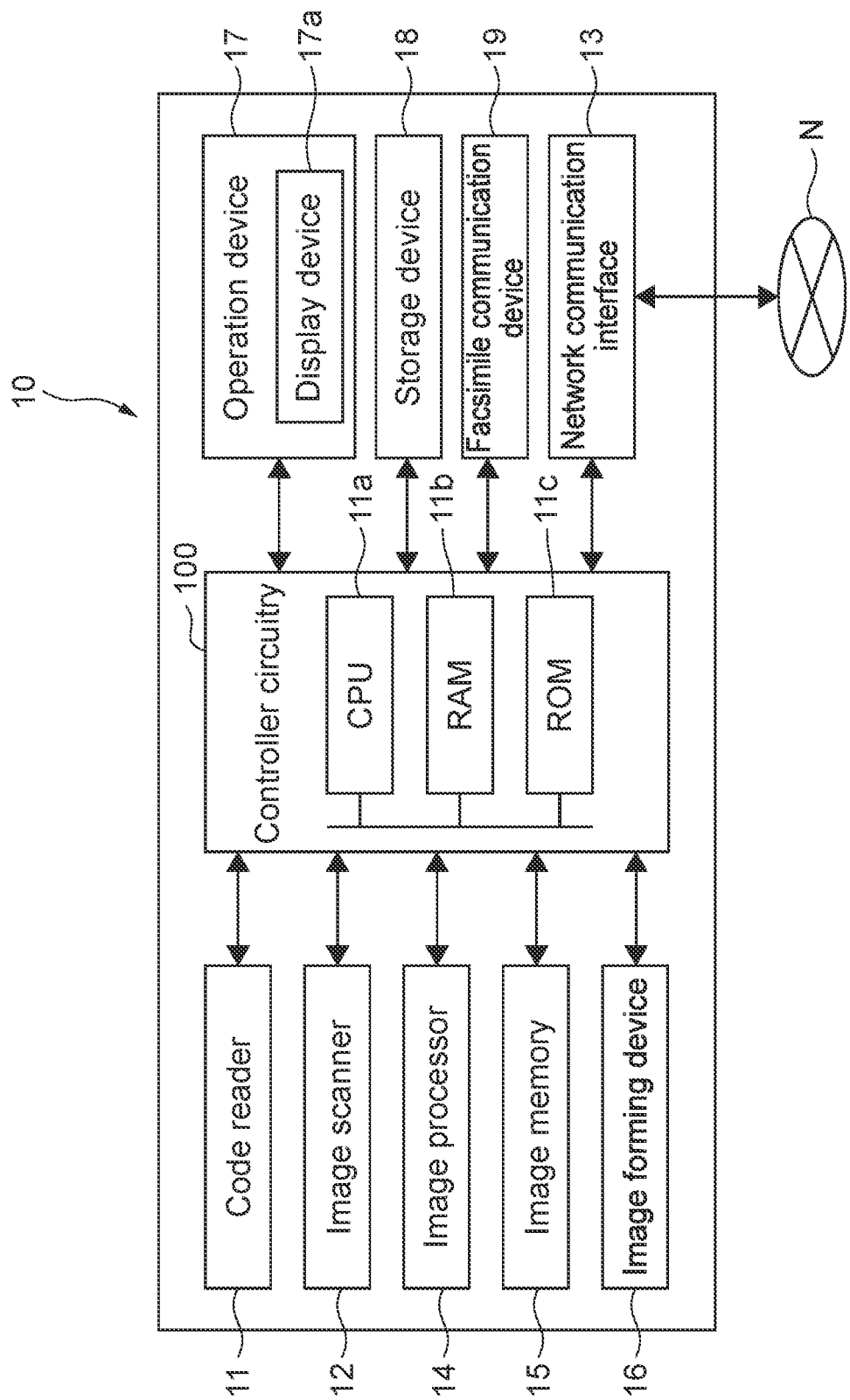
FIG. 2 shows a hardware configuration of an image forming apparatus.

FIG. 2 shows a hardware configuration of an image forming apparatus.

A hardware configuration of the image forming apparatus 10 will be described. The image forming apparatus 10 includes the controller circuitry 100. The controller circuitry 100 includes the CPU (Central Processing Unit) 11a, the RAM (Random Access Memory) 11b, the ROM (Read Only Memory) 11c, dedicated hardware circuitries, and the like and performs overall operational control of the image forming apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuitry 100 is connected to the code reader 11, the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuitry 100 performs operational control of the respective devices connected thereto and sends/receives signals and data to/from those devices. The operation device 17 (touch panel) is one mode of an input device. A sound input device including a microphone may be provided as an input device. The code reader 11 optically reads two-dimensional code (QR code (registered trademark), etc., the same applies to the following).

3. Hardware Configuration of First Document Server Apparatus

Figure 3:
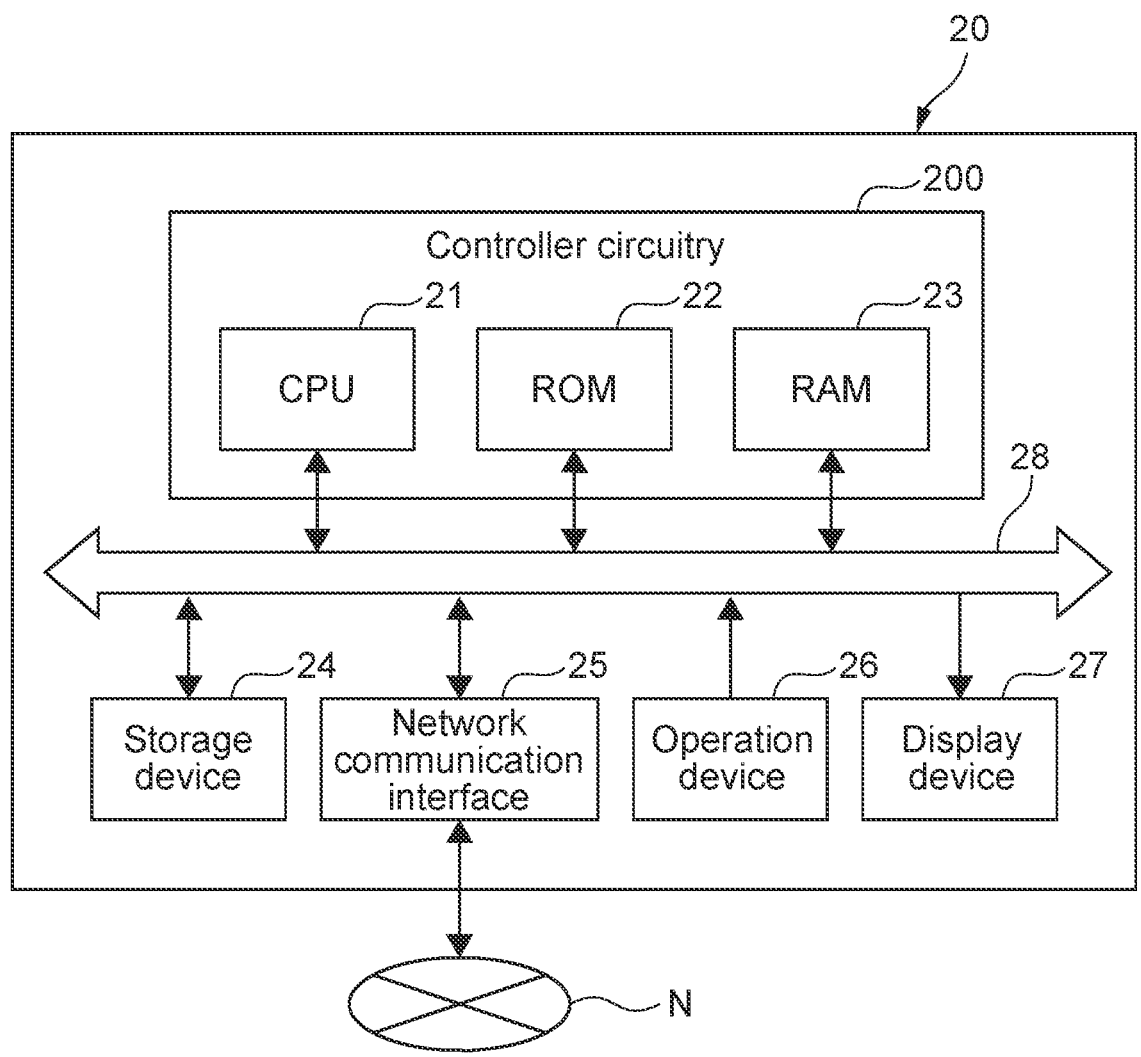
FIG. 3 shows a hardware configuration of a first document server apparatus.

FIG. 3 shows a hardware configuration of a first document server apparatus.

The first document server apparatus 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuitry 200 includes the CPU 21, the ROM 22, and the RAM 23. The CPU 21 loads information processing programs stored in the ROM 22 in the RAM 23 and executes the information processing programs. The ROM 22 stores programs executable by the CPU 21, data, and the like nonvolatile. The ROM 22 is an example of a non-transitory computer readable recording medium.

4. Hardware Configuration of Key Server Apparatus

Figure 4:
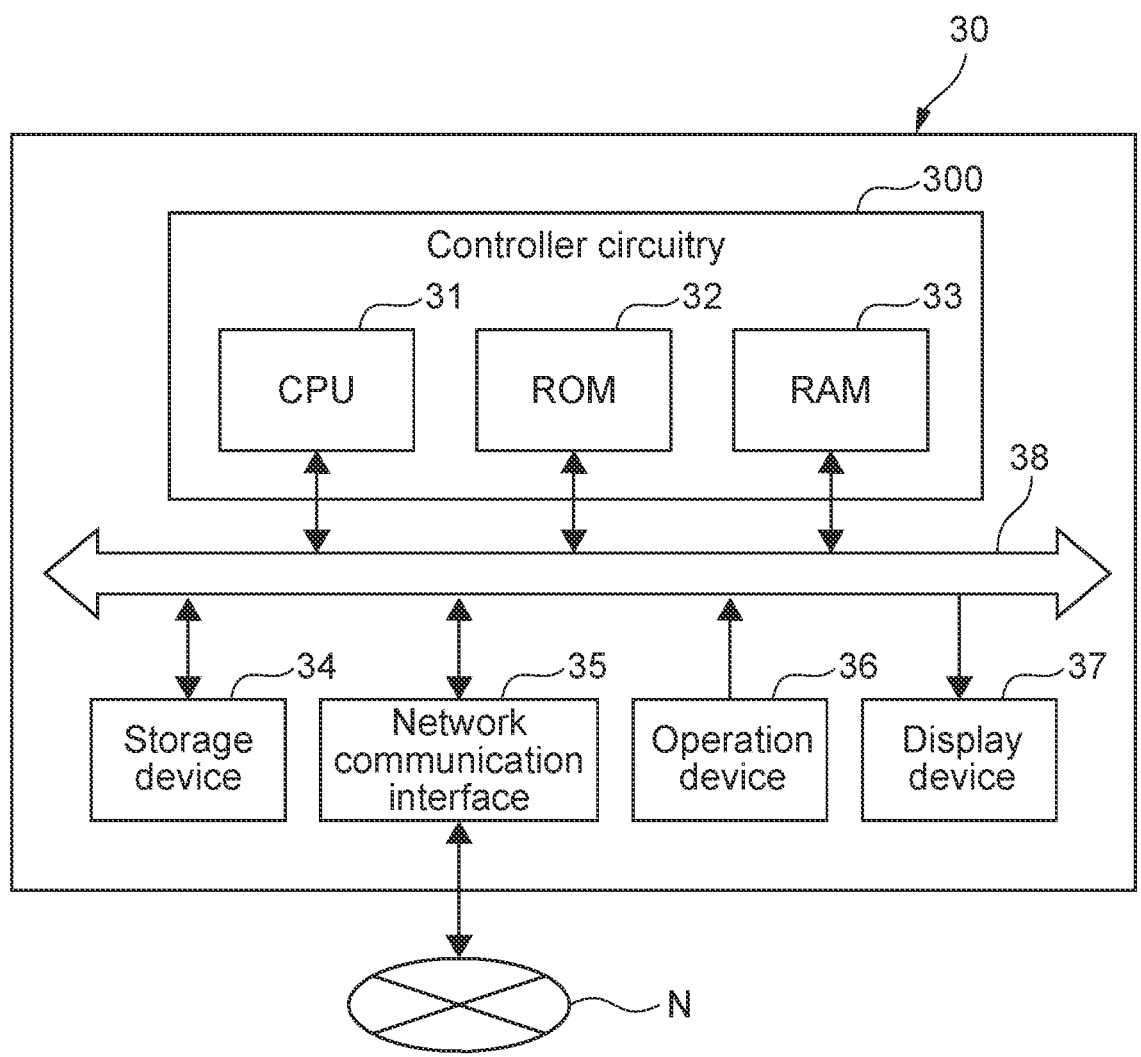
FIG. 4 shows a hardware configuration of a key server apparatus.

FIG. 4 shows a hardware configuration of a key server apparatus.

The key server apparatus 30 includes the CPU 31, the ROM 32, the RAM 33, the storage device 34, which is a large-volume nonvolatile memory such as an HDD or an SSD, the network communication interface 35, the operation device 36, and the display device 37, and the bus 38 connecting them to each other.

The controller circuitry 300 includes the CPU 31, the ROM 32, and the RAM 33. The CPU 31 loads information processing programs stored in the ROM 32 in the RAM 33 and executes the information processing programs. The ROM 32 stores programs executable by the CPU 31, data, and the like nonvolatile. The ROM 32 is an example of a non-transitory computer readable recording medium.

5. Hardware Configuration of Second Document Server Apparatus

Figure 5:
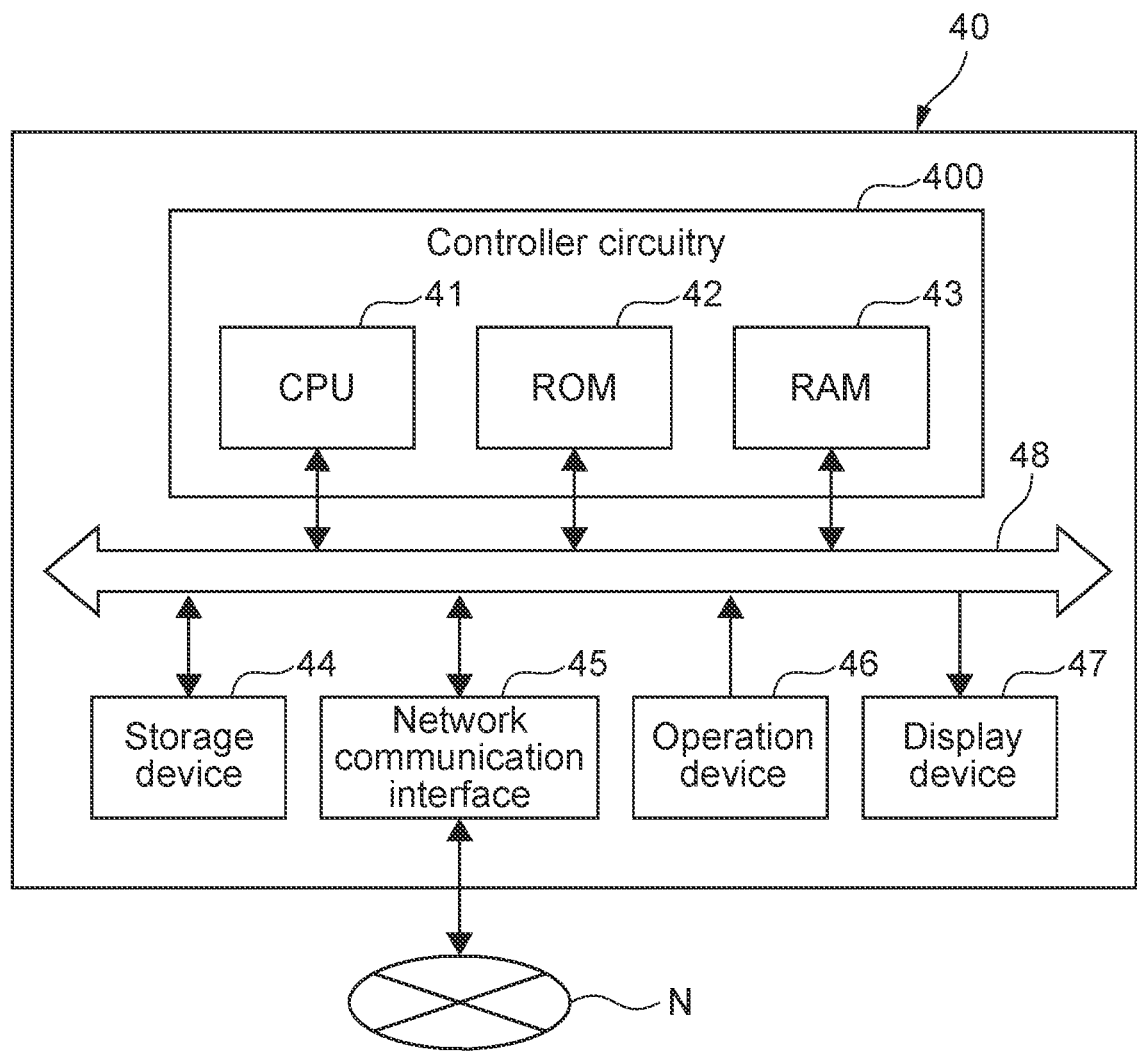
FIG. 5 shows a hardware configuration of a second document server apparatus.

FIG. 5 shows a hardware configuration of a second document server apparatus.

The second document server apparatus 40 includes the CPU 41, the ROM 42, the RAM 43, the storage device 44, which is a large-volume nonvolatile memory such as an HDD or an SSD, the network communication interface 45, the operation device 46, and the display device 47, and the bus 48 connecting them to each other.

The controller circuitry 400 includes the CPU 41, the ROM 42, and the RAM 43. The CPU 41 loads information processing programs stored in the ROM 42 in the RAM 43 and executes the information processing programs. The ROM 42 stores programs executable by the CPU 41, data, and the like nonvolatile. The ROM 42 is an example of a non-transitory computer readable recording medium.

6. First Functional Configuration of the Image Forming System (When Uploading Document Data)

Figure 6:
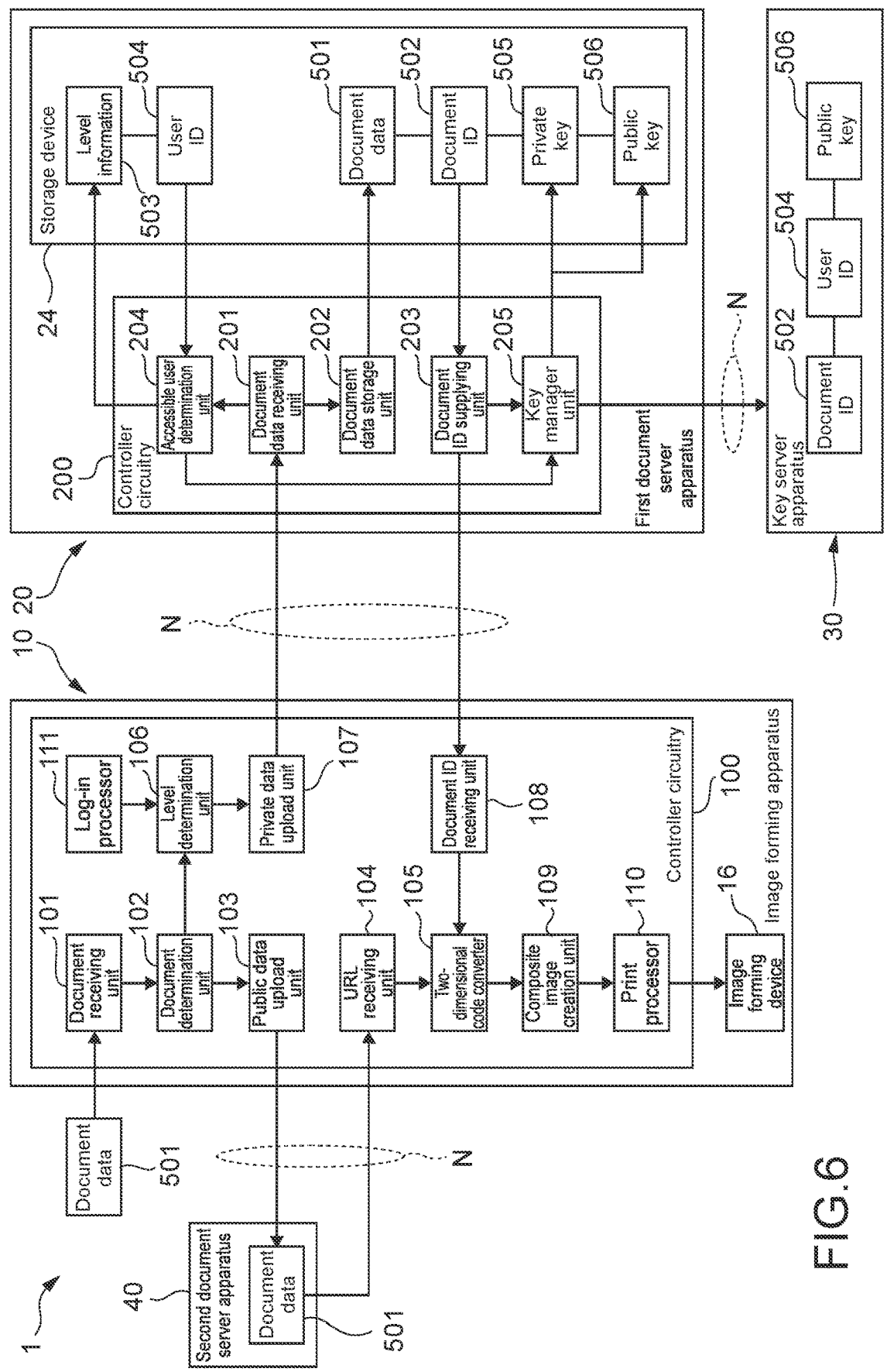
FIG. 6 shows a first functional configuration of the image forming system when uploading document data.

FIG. 6 shows a first functional configuration of the image forming system when uploading document data.

In the controller circuitry 100 of the image forming apparatus 10, the CPU 11a loads an information processing program stored in the ROM 11c to the RAM 11b and executes the loaded program, thereby operating as a document receiving unit 101, a document determination unit 102, a public data upload unit 103, a URL receiving unit 104, a two-dimensional code converter 105, a level determination unit 106, a private data upload unit 107, a document ID receiving unit 108, a composite image creation unit 109, a print processor 110, and a log-in processor 111.

In the controller circuitry 200 of the first document server apparatus 20, the CPU 21 loads an information processing program stored in the ROM 22 into the RAM 23 and executes the loaded program, thereby operating as the document data receiving unit 201, the document data storage unit 202, the document ID supplying unit 203, the accessible user determination unit 204, and the key manager unit 205.

7. First Operation Flow of the Image Forming System (When Uploading Document Data)

Figure 7:
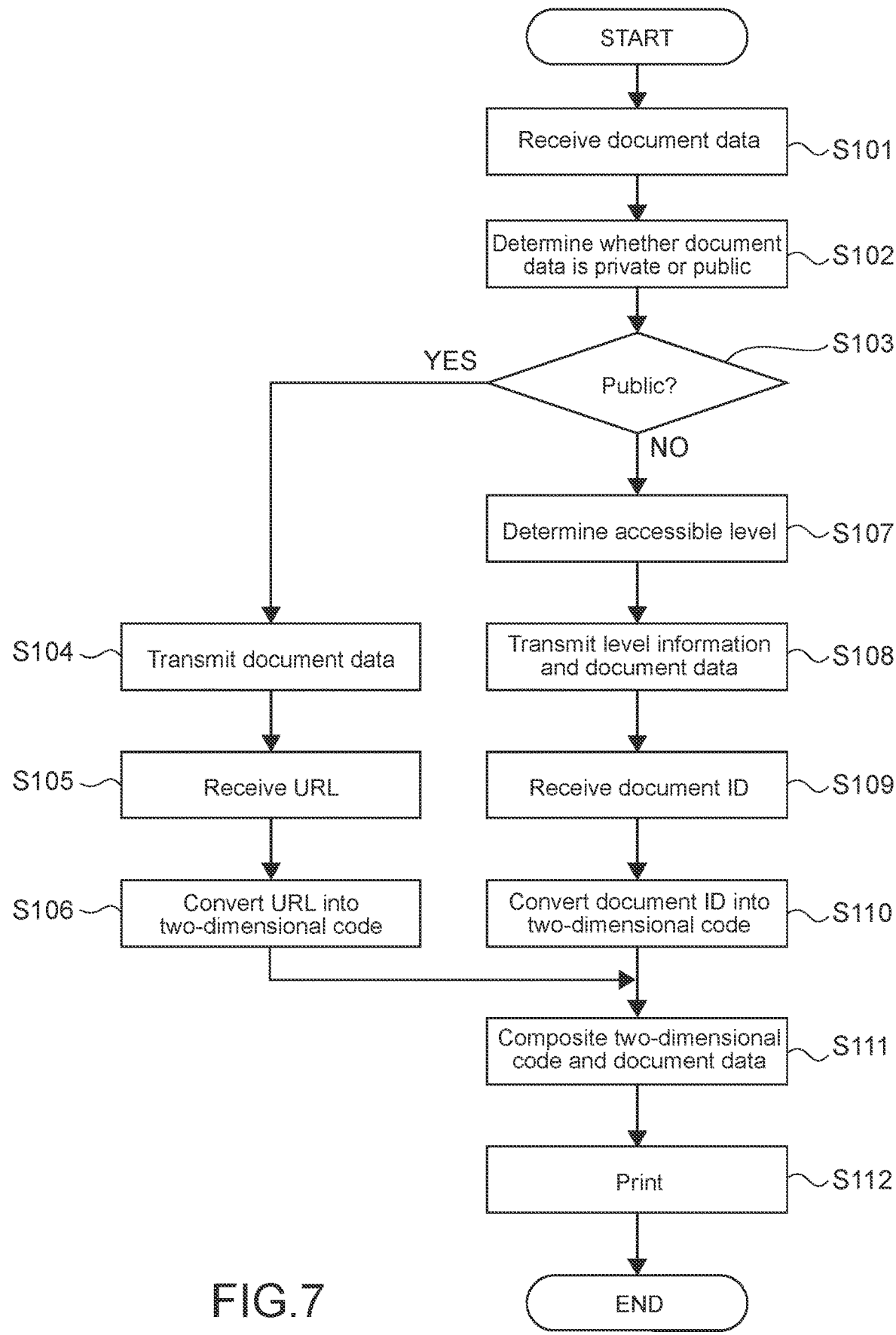
FIG. 7 shows a first operation flow of the image forming apparatus when uploading document data.

FIG. 7 shows a first operation flow of the image forming apparatus when uploading document data.

The document receiving unit 101 of the image forming apparatus 10 receives document data 501 from an end-user terminal device (a personal computer, a tablet computer, a smart phone, or the like, not shown) via the network N (step S101).

The document determination unit 102 of the image forming apparatus 10 detects a specific character string from a specific position (for example, a header or a footer) of the document by optical character recognition (OCR) over the document data 501. The document determination unit 102 determines whether the document data 501 is private or public based on the detected character string (step S102). For example, when the document determination unit 102 detects a character string such as "public use" or "out-side use," the document data 501 determines that the character string is public (step S103, YES). The document determination unit 102 determines that the document data 501 is private (step S103, NO) when it detects a character string such as "limited internally", "externally secret", or "prohibited externally". The document determination unit 102 may determine whether the document data 501 is private or public based on a user's manual input instead of optical character recognition.

If the document data is public (step S103, YES), the public data upload unit 103 of the image forming apparatus 10 specifies the destination path of the second document server apparatus 40 and transmits the document data 501 to the second document server apparatus 40 (step S104).

The second document server apparatus 40 stores the document data 501 in the storage device 44. The second document server apparatus 40 transmits the URL indicating the location of the document data 501 in the storage device 44 of the second document server apparatus to the image forming apparatus 10.

The URL receiving unit 104 of the image forming apparatus 10 receives the URL from the second document server apparatus 40 (step S105).

The two-dimensional code converter 105 of the image forming apparatus 10 converts the received URL into an optically readable two-dimensional code (second code) (step S106).

On the other hand, when the document data is private (step S103, NO), the level determination unit 106 of the image forming apparatus 10 determines a level accessible to the document data 501 (step S107). For example, the level determination unit 106 determines a level (group, administrator, etc.) including the user who logged in to the image forming apparatus 10 via the log-in processor 111 as an accessible level. Alternatively, the level determination unit 106 may cause a user who logged in to the image forming apparatus 10 to set the level via the operation device 17.

The private data upload unit 107 of the image forming apparatus 10 specifies the destination path of the first document server apparatus 20, and transmits the level information 503 indicating the level and the document data 501 to the first document server apparatus (step S108).

Figure 8:
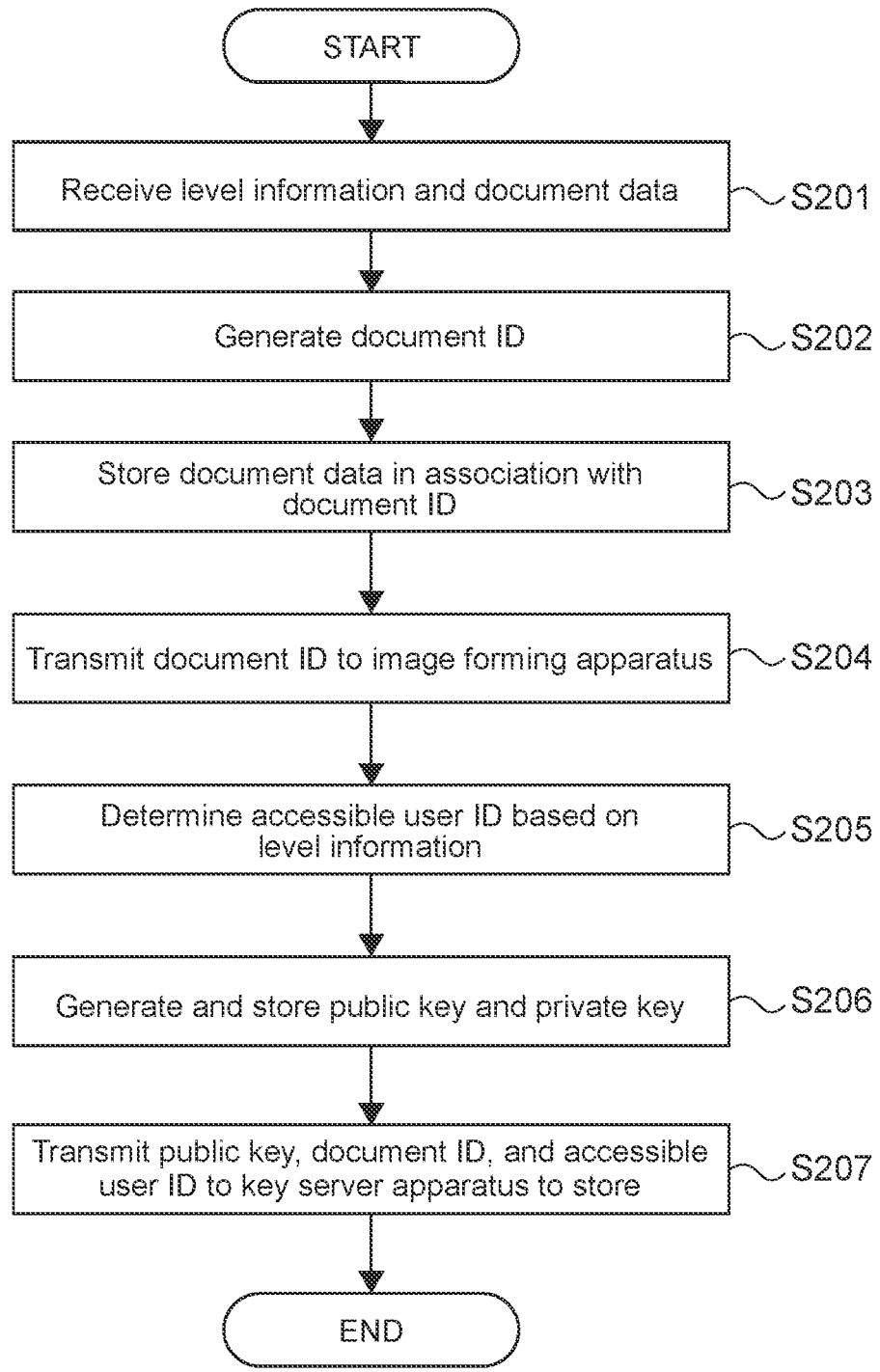
FIG. 8 shows a first operation flow of the first document server apparatus when uploading document data.

FIG. 8 shows a first operation flow of the first document server apparatus when uploading document data.

The document data receiving unit 201 of the first document server apparatus 20 receives the level information 503 and the document data 501 from the image forming apparatus 10 (step S201).

The document data storage unit 202 of the first document server apparatus 20 generates a document ID 502 for identifying the document data 501 (step S202). The document data storage unit 202 stores the document data 501 in the storage device 24 in association with the document ID 502 (step S203).

The document ID supplying unit 203 of the first document server apparatus 20 transmits the document ID 502 to the image forming apparatus 10 (step S204).

The accessible user determination unit 204 of the first document server apparatus 20 determines the accessible user ID 504 based on the level information 503 received from the image forming apparatus 10 (step S205). An accessible user ID 504 is an ID that identifies a user who is accessible to the document data 501. More specifically, the storage device 24 of the first document server apparatus 20 stores one or more user IDs 504 in association with the level information 503 indicating a plurality of levels. The accessible user determination unit 204 reads out all of the one or more user IDs 504 associated with the received level information 503. The users identified by the one or more read user IDs 504 are the users accessible to the document data 501.

The key manager unit 205 of the first document server apparatus 20 generates a public key 506 and a private key 505 used for encrypting the document data 501. The key manager unit 205 stores the private key 505 and the public key 506 in the storage device 24 in association with the document ID 502 (step S206). The key manager unit 205 transmits the public key 506, the document ID 502, and the accessible user ID 504 to the key server apparatus 30, and stores the public key 506, the document ID 502, and the accessible user ID 504 in the key server apparatus 30 (step S207).

The key server apparatus 30 receives the public key 506, the document ID 502, and the accessible user ID 504 from the first document server apparatus 20, and stores the public key 506, the document ID 502, and the accessible user ID 504 in the storage device 34 in association with each other.

On the other hand, the document ID receiving unit 108 of the image forming apparatus 10 receives the document ID 502 (step S204) from the first document server apparatus 20 (step S109).

The two-dimensional code converter 105 of the image forming apparatus 10 converts the received document ID 502 into an optically readable two-dimensional code (first code) (step S110).

The composite image creation unit 109 of the image forming apparatus 10 composites the two-dimensional code (step S106 or step S110) and the document data 501 to generate composite document data (step S111). The print processor 110 draws an image of the composite document data, and forms (prints) the image on a print medium using the image forming device 16 (printer) (step S112).

8. Second Functional Configuration of the Image Forming System (When Downloading Document Data)

Figure 9:
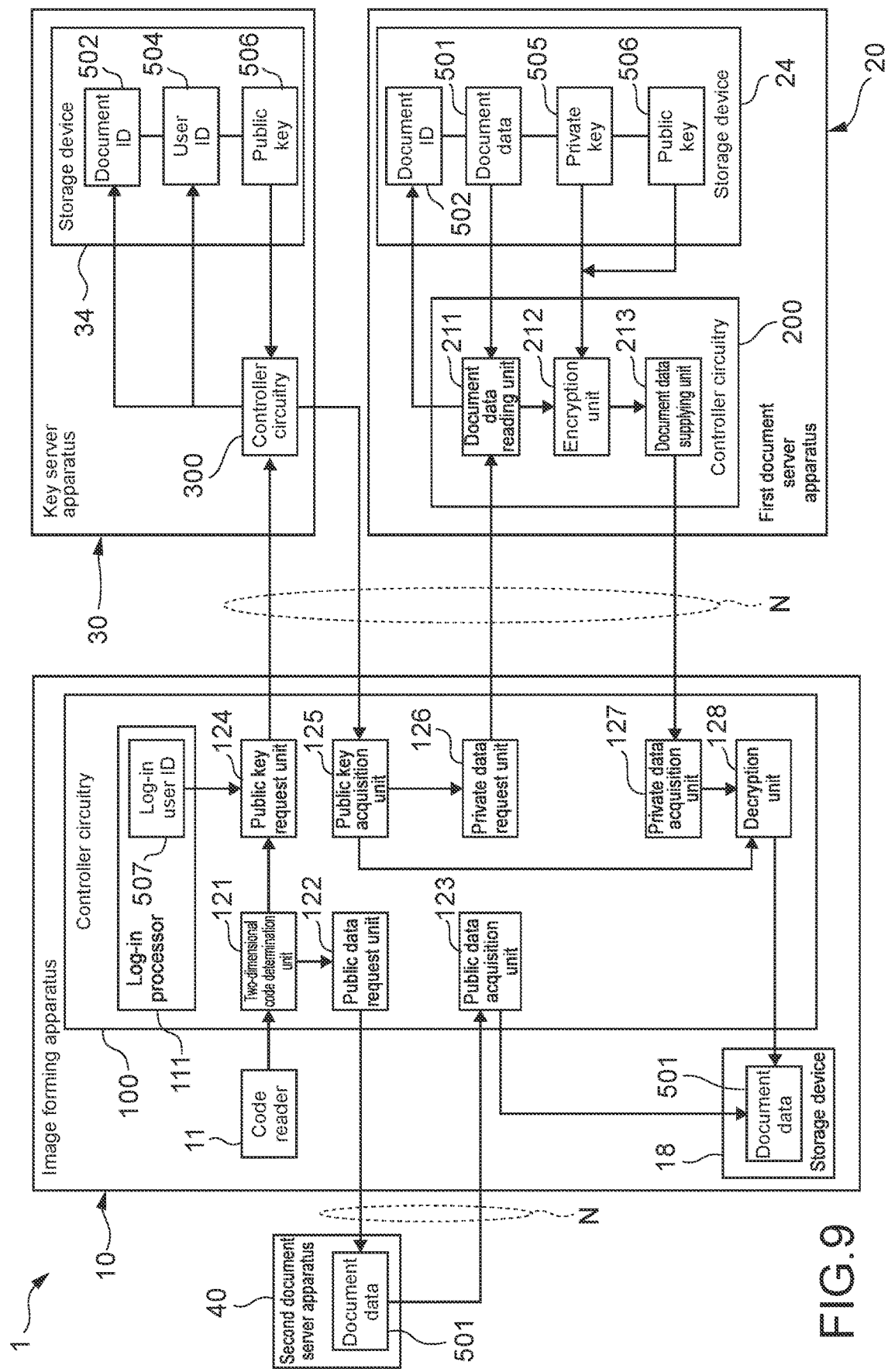
FIG. 9 shows a second functional configuration of the image forming system when downloading document data.

FIG. 9 shows a second functional configuration of the image forming system when downloading document data.

In the controller circuitry 100 of the image forming apparatus 10, the CPU 11a loads an information processing program stored in the ROM 11c into the RAM 11b and executes the loaded program, thereby operating as a two-dimensional code determination unit 121, a public data request unit 122, a public data acquisition unit 123, a public key request unit 124, a public key acquisition unit 125, a private data request unit 126, a private data acquisition unit 127, a decryption circuitry 128, and a log-in processor 111.

In the controller circuitry 200 of the first document server apparatus 20, the CPU 21 loads an information processing program stored in the ROM 22 into the RAM 23 and executes the loaded program, thereby operating as the document data reading unit 211, the encryption unit 212, and the document data supplying unit 213.

9. Second Operation Flow of the Image Forming System (When Downloading Document Data)

Figure 10:
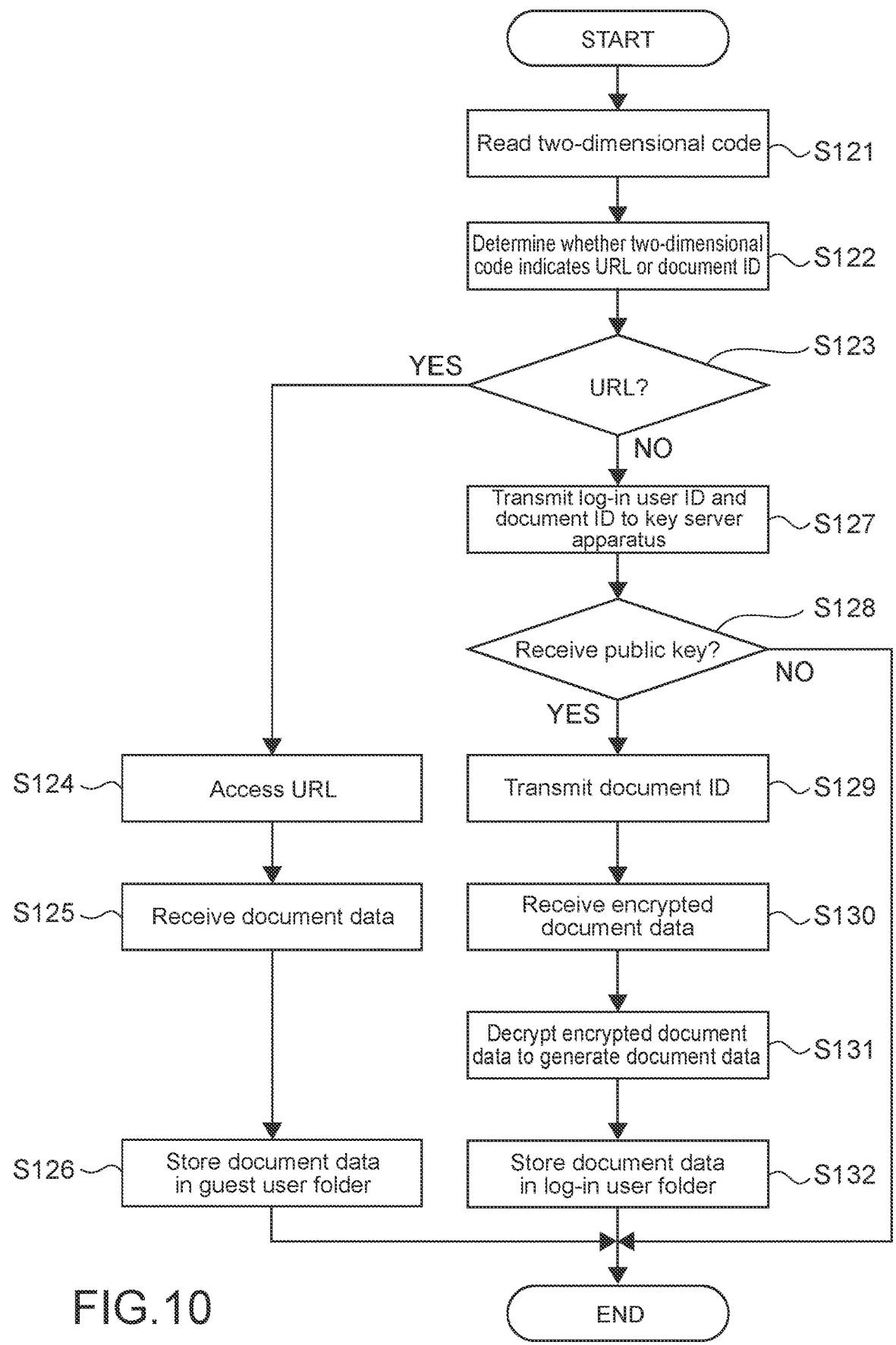
FIG. 10 shows a second operation flow of the image forming apparatus when downloading document data.

FIG. 10 shows a second operation flow of the image forming apparatus when downloading document data.

The user holds the print medium on which the image of the two-dimensional code is formed (printed) (step S112) over the code reader 11 of the image forming apparatus 10.

The two-dimensional code determination unit 121 of the image forming apparatus 10 acquires an image of the two-dimensional code included in the composite document data formed on the print medium, which is optically read using the code reader 11 (step S121). The two-dimensional code determination unit 121 determines whether the two-dimensional code indicates a URL (step S106) or a document ID 502 (step S110) (step S122).

When the two-dimensional code indicates the URL (step S123, YES), the public data request unit 122 of the image forming apparatus 10 specifies the destination path of the second document server apparatus 40, accesses the URL read from the two-dimensional code (indicating the location of the second document server apparatus), and requests downloading of the document data 501 (step S124). The public data acquisition unit 123 of the image forming apparatus 10 receives the document data 501 read from the location of the second document server apparatus 40 indicated by the URL (step S125). The public data acquisition unit 123 stores the received document data 501 in a guest user folder of the storage device 18 of the image forming apparatus 10 (step S126). The guest user folder is a shared folder that is not associated with a specific user (log-in user). The document data 501 stored in the guest user folder does not require a log-in to the image forming apparatus 10 and can be output (printed, facsimile transmitted, e-mail transmitted, or the like) by an unspecified user's operation.

On the other hand, when the two-dimensional code indicates the document ID 502 (step S123, NO), the public key request unit 124 of the image forming apparatus 10 transmits the log-in user ID 507 identifying the user who logged in to the image forming apparatus 10 via the log-in processor 111 and the document ID 502 read from the two-dimensional code to the key server apparatus 30 (step S127).

Figure 11:
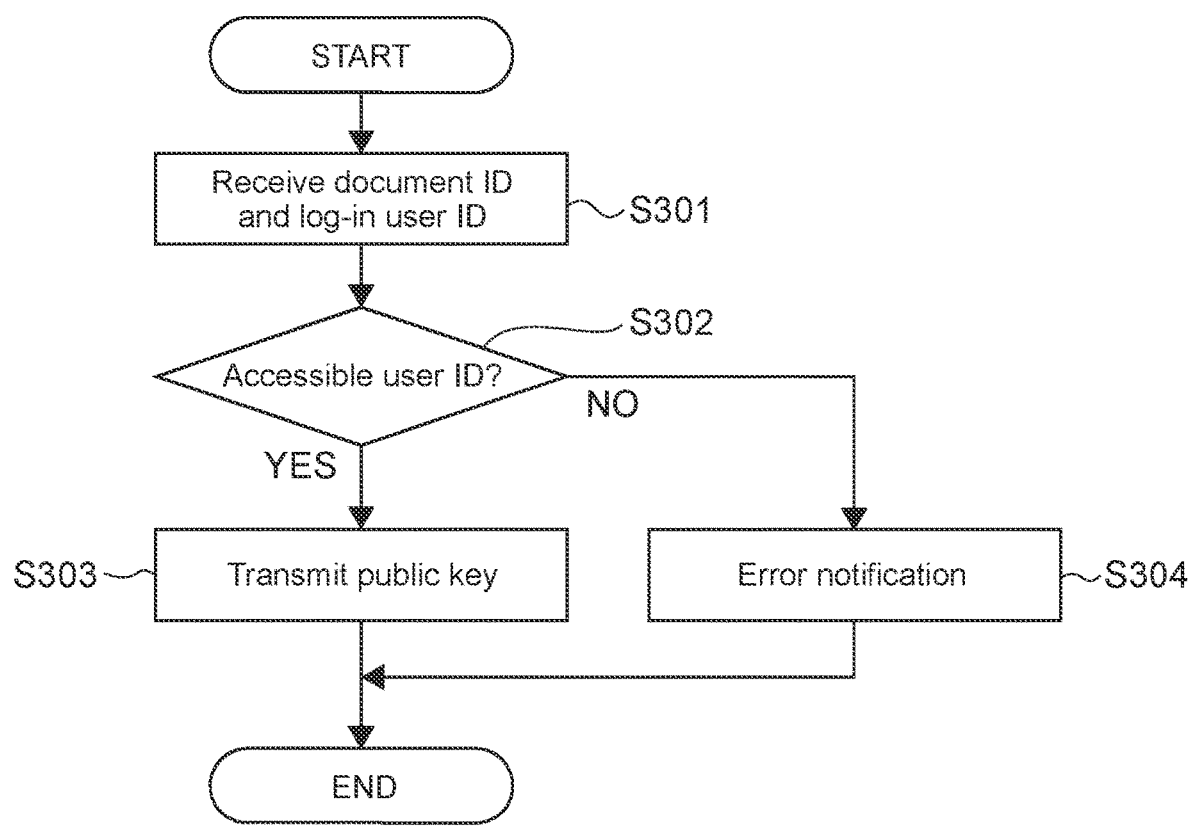
FIG. 11 shows an operation flow of the key server apparatus.

FIG. 11 shows an operation flow of the key server apparatus.

The key server apparatus 30 receives the document ID 502 and the log-in user ID 507 from the image forming apparatus 10 (step S301). The key server apparatus 30 determines whether or not the received log-in user ID 507 matches the accessible user ID 504 (step S207) stored in association with the received document ID 502 (step S302). When the key server apparatus 30 determines that the received log-in user ID 507 matches the accessible user ID 504 stored in association with the received document ID 502 (step S302, YES), the key server apparatus 30 transmits the public key 506 stored in association with the document ID 502 to the image forming apparatus 10 (step S303). On the other hand, when the key server apparatus 30 determines that the received log-in user ID 507 does not coincide with the accessible user ID 504 stored in association with the received document ID 502 (step S302, NO), the key server apparatus 30 transmits an error notification to the image forming apparatus 10 (step S304).

The public key acquisition unit 125 of the image forming apparatus 10 receives the public key 506 from the key server apparatus 30 (step S128, YES). When the image forming apparatus 10 receives the error notification (step S304) without receiving the public key 506, the processing is terminated without performing the following processing (step S128, NO).

Next, the private data request unit 126 of the image forming apparatus 10 designates the destination path of the first document server apparatus 20, and transmits the document ID 502 read from the two-dimensional code to the first document server apparatus 20 (step S129).

Figure 12:
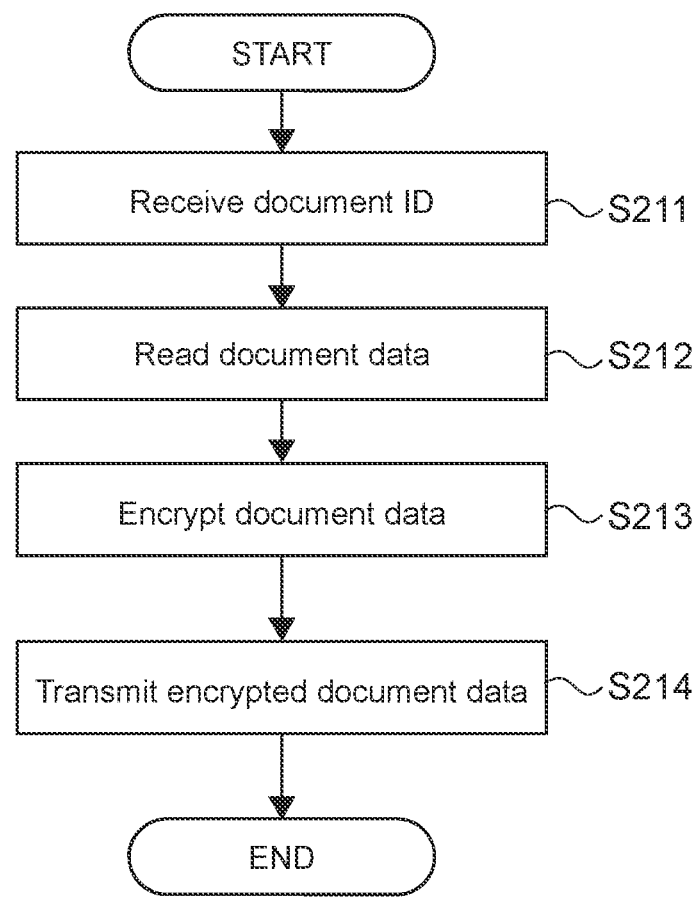
FIG. 12 shows a second operation flow of the first document server apparatus when downloading document data.

FIG. 12 shows a second operation flow of the first document server apparatus when downloading document data.

The document data reading unit 211 of the first document server apparatus 20 receives the document ID 502 from the image forming apparatus 10 (step S211). The document data reading unit 211 reads the document data 501 (step S203) stored in association with the received document ID 502 from the storage device 24 (step S212).

The encryption unit 212 of the first document server apparatus 20 reads the private key 505 and the public key 506 (step S206) stored in association with the document ID 502 from the storage device 24. The encryption unit 212 generates encrypted document data by encrypting the read document data 501 using the private key 505 and the public key 506 (step S213).

The document data supplying unit 213 of the first document server apparatus 20 transmits the encrypted document data to the image forming apparatus 10 (step S214).

The private data acquisition unit 127 of the image forming apparatus 10 receives the encrypted document data from the first document server apparatus 20 (step S130).

The decryption unit 128 of the image forming apparatus 10 decrypts the received encrypted document data using the public key 506 (step S128, YES) received from the key server apparatus 30 to generate the document data 501 (step S131). The decryption unit 128 stores the generated document data 501 in the log-in user folder of the storage device 18 of the image forming apparatus 10 (step S132). The log-in user folder is a personal folder associated with a user who has logged in to the image forming apparatus 10. The document data 501 stored in the log-in user folder can be output (printed, facsimile transmitted, e-mail transmitted, or the like) by a user who has logged in to the image forming apparatus 10.

10. Conclusion (1) According to the present embodiment, the image forming apparatus 10 determines whether the document data 501 is private or public, determines the level accessible to the document data 501 when the document data 501 is determined to be private, and transmits the level information 503 indicating the level and the document data 501 to the first document server apparatus 20. The first document server apparatus 20 receives the level information 503 and the document data 501 from the image forming apparatus 10, generates a document ID 502 for identifying the document data 501, stores the document data 501 in association with the document ID 502, transmits the document ID 502 to the image forming apparatus 10, determines an accessible user ID 504 that identifies a user accessible to the document data 501 based on the level information 503, generates a public key 506 and a private key 505 used to encrypt the document data 501, stores the private key 505 and the public key 506 in association with the document ID 502, and transmits the public key 506, the document ID 502, and the accessible user ID 504 to the key server apparatus 30. The image forming apparatus 10 receives the document ID 502 from the first document server apparatus 20, converts the document ID 502 into a two-dimensional code (first code) optically readable, combines the two-dimensional code (first code) and the document data 501 to generate composite document data, and forms an image of the composite document data on a print medium. The key server apparatus 30 receives the public key 506, the document ID 502, and the accessible user ID 504 from the first document server apparatus 20 and stores the public key 506, the document ID 502, and the accessible user ID 504 in association with each other.

Thus, when the document data 501 is private, the image forming apparatus 10 converts the document ID 502 defined by the first document server apparatus 20 of the document data 501 into a two-dimensional code and prints the two-dimensional code. Thus, when the two-dimensional code is read, the location (URL) of the document data 501 is not read. Therefore, an unspecified user cannot access the document data 501 (digital copy) in the first document server apparatus 20. Specifically, the first document server apparatus 20 transmits the accessible user ID 504 that identifies the user accessible to the document data 501 determined based on the level information 503 received from the image forming apparatus 10 and the document ID 502 to the key server apparatus 30, and stores the accessible user ID 504 and the document ID 502 in the key server apparatus 30. Thus, only the user identified by the accessible user ID 504 can access (can download) the document data 501. This allows the private document data 501 to be uploaded with high security.

(2) According to the present embodiment, the image forming apparatus 10 optically reads the image of the two-dimensional code (first code) formed on the print medium, determines the document ID 502 based on the two-dimensional code (first code), determines the log-in user ID 507 identifying the user who logs in to the image forming apparatus 10, and transmits the document ID 502 and the log-in user ID 507 to the key server apparatus 30. The key server apparatus 30 receives the document ID 502 and the log-in user ID 507 from the image forming apparatus 10, and when the received log-in user ID 507 matches the accessible user ID 504 stored in association with the received document ID 502, transmits the public key 506 in association with the document ID 502 to the image forming apparatus 10. The image forming apparatus 10 receives the public key 506 from the key server apparatus 30 and transmits the document ID 502 to the first document server apparatus 20. The first document server apparatus 20 receives the document ID 502 from the image forming apparatus 10, encrypts the document data 501 identified by the document ID 502 using the private key 505 and the public key 506 to generate encrypted document data, and transmits the encrypted document data to the image forming apparatus 10. The image forming apparatus 10 receives the encrypted document data from the first document server apparatus 20 and decrypts the encrypted document data using the public key 506.

Thus, when the document data 501 is private, the first document server apparatus 20 generates encrypted document data by encrypting the document data 501 using the private key 505 and the public key 506, and transmits the encrypted document data to the image forming apparatus 10.

Thus, the security is higher than when the first document server apparatus 20 transmits the encrypted document data and transmits the document data 501 without encryption. The image forming apparatus 10 transmits the document ID 502 and the log-in user ID 507 to the key server apparatus 30. When the log-in user ID 507 received from the image forming apparatus 10 matches the accessible user ID 504 stored in association with the received document ID 502, the key server apparatus 30 transmits the public key 506 stored in association with the document ID 502 to the image forming apparatus 10. As a result, the image forming apparatus 10 can acquire the public key 506 and decrypt the document data 501 only when the user identified by the accessible user ID 504 has logged in. This allows the private document data 501 to be downloaded with high security.

(3) According to the present embodiment, when determining that the document data 501 is public, the image forming apparatus 10 transmits the document data 501 to the second document server apparatus 40. The second document server apparatus 40 stores the document data 501 and transmits a URL indicating the location of the document data 501 in the second document server apparatus 40 to the image forming apparatus 10. The image forming apparatus 10 receives the URL from the second document server apparatus 40, converts the URL into an optically readable two-dimensional code (second code), combines the two-dimensional code (second code) and the document data 501 to generate combined document data, and forms an image of the combined document data on a print medium.

As described above, when the document data 501 is public, the image forming apparatus 10 converts the URL indicating the location of the document data 501 in the second document server apparatus 40 into a two-dimensional code and prints the two-dimensional code. Thus, any user who can access the image forming apparatus 10 can access the document data 501 (digital copy) in the second document server apparatus 40.

(4) According to the present embodiment, the image forming apparatus 10 optically reads the image of the two-dimensional code (second code) formed on the print medium, determines the URL based on the two-dimensional code (second code), and reads the document data 501 from the location of the second document server apparatus 40 indicated by the URL. Thus, since the processing such as encryption is not performed at the time of downloading, the download processing time can be shortened, which is user-friendly when it is not necessary to consider the security of the document data 501.

(5) According to the present embodiment, the image forming apparatus 10 detects a specific character string by optically recognizing the document data 501, and determines whether the document data 501 is private or public based on the character string. As a result, since the image forming apparatus 10 automatically determines whether the document data 501 is private or public, it is possible to prevent the user from manual input labor and to prevent the occurrence of a setting error caused by the manual input.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming system, comprising:
   an image forming apparatus;
   a first document server apparatus communicably connected to the image forming apparatus; and a key server apparatus communicably connected to the image forming apparatus and the first document server apparatus, the image forming apparatus being configured to
  determine whether document data is private or public,
  when the document data is determined to be private, then
    determine a level accessible to the document data, and
    transmit level information indicating the level and the document data to the first document server apparatus,
the first document server apparatus being configured to
  receive the level information and the document data from the image forming apparatus,
  generate a document ID for identifying the document data,
  store the document data in association with the document ID,
  transmit the document ID to the image forming apparatus,
  determine an accessible user ID that identifies a user accessible to the document data based on the level information,
  generate a public key and a private key used to encrypt the document data,
  store the private key and the public key in association with the document ID, and
  transmit the public key, the document ID, and the accessible user ID to the key server apparatus,
the image forming apparatus being configured to
  receive the document ID from the first document server apparatus,
  convert the document ID into a first code optically readable,
  combine the first code and the document data to generate composite document data, and
  form an image of the composite document data on a print medium,
the key server apparatus being configured to
  receive the public key, the document ID, and the accessible user ID from the first document server apparatus and stores the public key, the document ID, and the accessible user ID in association with each other.

2. The image forming system according to claim 1, wherein
the image forming apparatus is configured to
  optically read the image of the first code formed on the print medium,
  determine the document ID based on the first code,
  determine a log-in user ID identifying a user who logs in to the image forming apparatus, and
  transmit the document ID and the log-in user ID to the key server apparatus,
the key server apparatus is configured to
  receive the document ID and the log-in user ID from the image forming apparatus, and
  when the received log-in user ID matches the accessible user ID stored in association with the received document ID, then
    transmit the public key in association with the document ID to the image forming apparatus,
the image forming apparatus is configured to
  receive the public key from the key server apparatus, and
  transmit the document ID to the first document server apparatus, the first document server apparatus is configured to
  receive the document ID from the image forming apparatus,
  encrypt the document data identified by the document ID using the private key and the public key to generate encrypted document data, and
  transmit the encrypted document data to the image forming apparatus, and
the image forming apparatus is configured to
  receive the encrypted document data from the first document server apparatus, and
  decrypt the encrypted document data using the public key.

3. The image forming system according to claim 1, further comprising:
a second document server apparatus communicably connected to the image forming apparatus, wherein
the image forming apparatus is configured to
  when determining that the document data is public, then
    transmit the document data to the second document server apparatus,
the second document server apparatus is configured to
  store the document data, and
  transmit a URL indicating a location of the document data in the second document server apparatus to the image forming apparatus, and
the image forming apparatus is configured to
  receive the URL from the second document server apparatus,
  convert the URL into a second code optically readable,
  combine the second code and the document data to generate combined document data, and
  form an image of the combined document data on a print medium.

4. The image forming system according to claim 3, wherein
the image forming apparatus is configured to
  optically read the image of the second code formed on the print medium,
  determine the URL based on the second code, and
  read the document data from the location of the second document server apparatus indicated by the URL.

5. The image forming system according to claim 1, wherein
the image forming apparatus is configured to
  detect a specific character string by optically recognizing the document data, and
  determine whether the document data is private or public based on the character string.

6. An image forming apparatus, that is included in an image forming system, including:
the image forming apparatus,
a first document server apparatus communicably connected to the image forming apparatus, and
a key server apparatus communicably connected to the image forming apparatus and the first document server apparatus,
the image forming apparatus being configured to
  determine whether document data is private or public,
  when the document data is determined to be private, then
    determine a level accessible to the document data, and
    transmit level information indicating the level and the document data to the first document server apparatus,
the first document server apparatus being configured to receive the level information and the document data from the image forming apparatus, generate a document ID for identifying the document data, store the document data in association with the document ID, transmit the document ID to the image forming apparatus, determine an accessible user ID that identifies a user accessible to the document data based on the level information, generate a public key and a private key used to encrypt the document data, store the private key and the public key in association with the document ID, and transmit the public key, the document ID, and the accessible user ID to the key server apparatus, the image forming apparatus being configured to receive the document ID from the first document server apparatus, convert the document ID into a first code optically readable, combine the first code and the document data to generate composite document data, and form an image of the composite document data on a print medium, the key server apparatus being configured to receive the public key, the document ID, and the accessible user ID from the first document server apparatus and stores the public key, the document ID, and the accessible user ID in association with each other.

7. A first document server apparatus, that is included in an image forming system, including:

an image forming apparatus;

the first document server apparatus communicably connected to the image forming apparatus; and a key server apparatus communicably connected to the image forming apparatus and the first document server apparatus, the image forming apparatus being configured to determine whether document data is private or public, when the document data is determined to be private, then determine a level accessible to the document data, and transmit level information indicating the level and the document data to the first document server apparatus, the first document server apparatus being configured to receive the level information and the document data from the image forming apparatus, generate a document ID for identifying the document data, store the document data in association with the document ID, transmit the document ID to the image forming apparatus, determine an accessible user ID that identifies a user accessible to the document data based on the level information, generate a public key and a private key used to encrypt the document data, store the private key and the public key in association with the document ID, and transmit the public key, the document ID, and the accessible user ID to the key server apparatus, the image forming apparatus being configured to receive the document ID from the first document server apparatus, convert the document ID into a first code optically readable, combine the first code and the document data to generate composite document data, and form an image of the composite document data on a print medium, the key server apparatus being configured to receive the public key, the document ID, and the accessible user ID from the first document server apparatus and stores the public key, the document ID, and the accessible user ID in association with each other.

* * * * *